Oct. 2, 1962 P. LAVALLÉE 3,056,504
FILTERING DEVICE
Filed Sept. 3, 1959 4 Sheets-Sheet 4
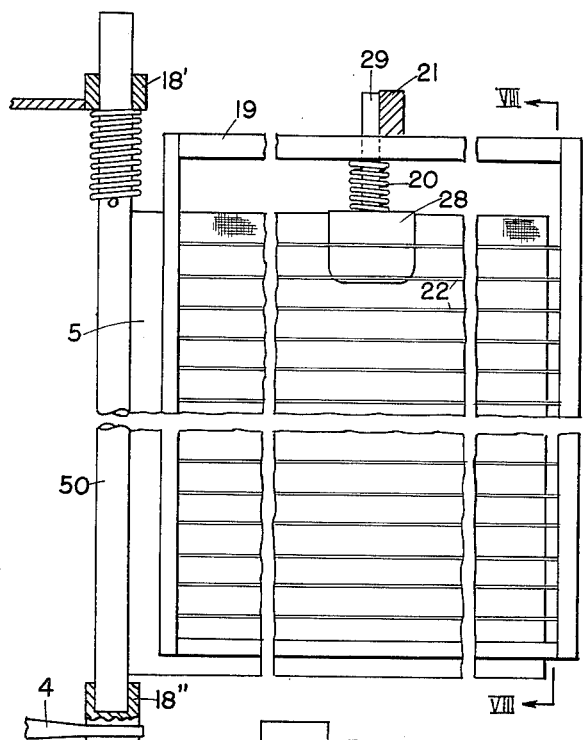
FIG.7
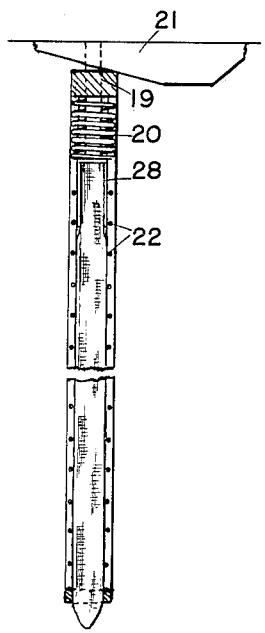
FIG.8
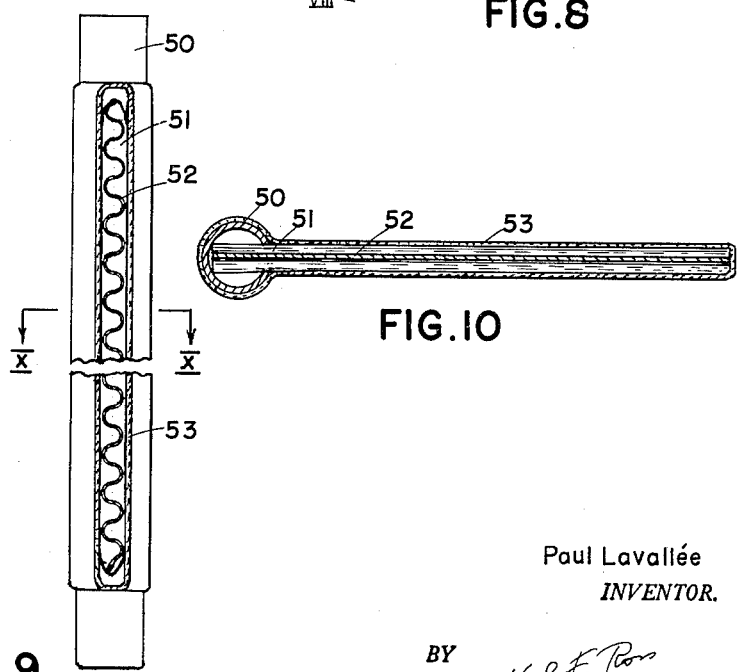
FIG.9
FIG.10
Paul Lavallée
*INVENTOR.*
BY *Karl F. Ross*
AGENT.

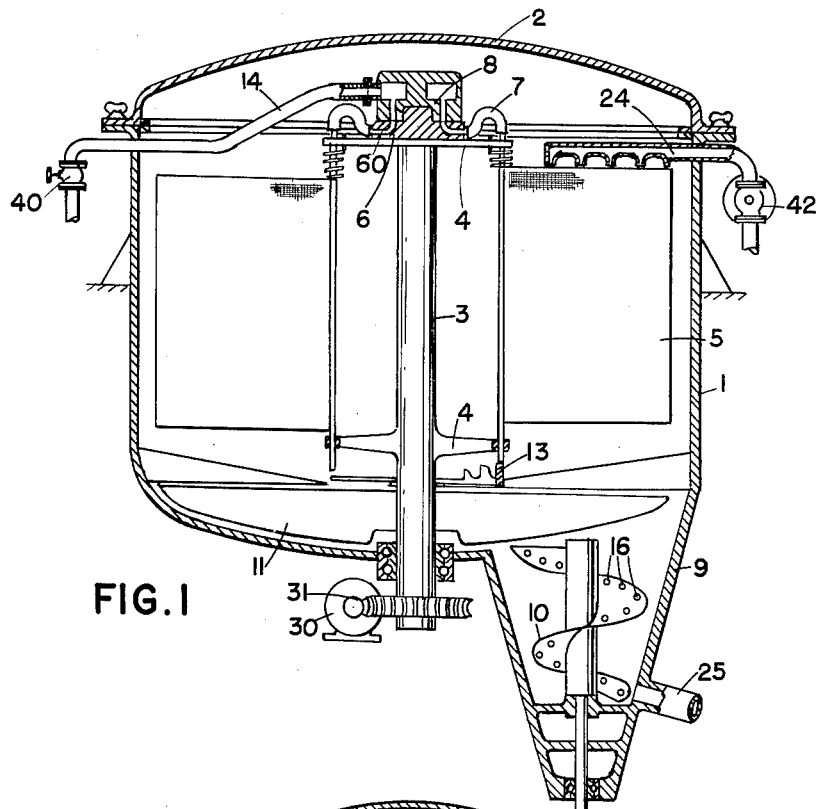
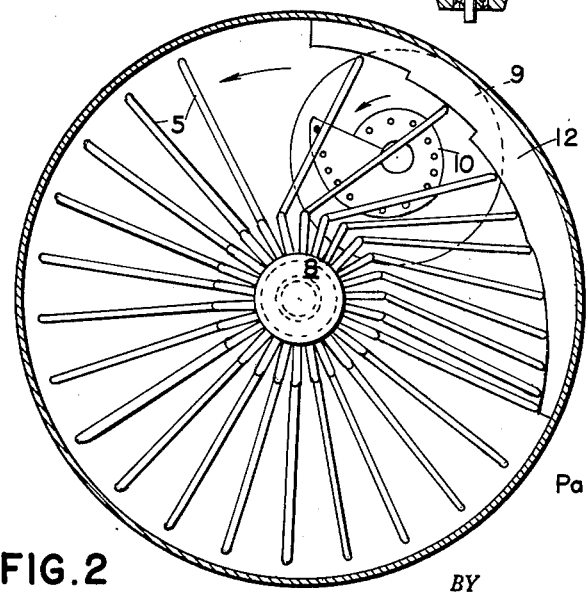
FIG.1
FIG.2
Paul Lavallée
INVENTOR.
AGENT.

United States Patent Office 3,056,504
Patented Oct. 2, 1962

3,056,504
FILTERING DEVICE
Paul Lavallée, 1 Rue Lord Byron, Paris 8, France
Filed Sept. 3, 1959, Ser. No. 837,914
Claims priority, application France Sept. 4, 1958
12 Claims. (Cl. 210—328)

My present invention relates to a filtering device and, more particularly but not exclusively, to a filter adapted to serve as a thickener for the juices of sugar refineries and the like containing carbonaceous or other insoluble matter in suspension.

In sugar-refining and other extraction processes it is necessary to separate a clear liquid from a heavier residue of desired concentration. Maintenance of the purity of the filtrate and of the proper consistency of the concentrate has hitherto required cumbersome extraction devices with voluminous separating chambers and large filtering surfaces. Moreover, these devices were not only slow in operation but difficult to control as to uniformity of output.

It is an object of my invention to provide an improved filtering device for separating a liquid from a concentrate by successive stages of filtration at progressively increasing pressure differentials to insure a maximum recovery of clear liquid and of concentrated residue from cane or beet juices and the like.

Another object of my invention is to provide a compact apparatus of large filter-surface-to-volume ratio for extracting insoluble matter in suspension from a liquid under pressure.

A further, more specific object of my invention is to provide means for automatically clearing the filtering surfaces of an extractor of this type without necessitating the cessation of filtering activity in the apparatus.

A feature of the present invention is the provision, within a vessel containing a charge of liquid to be processed, of a filter member successively encountering progressively greater pressure differentials at a sequence of operating stations whereby the insoluble matter suspended in the liquid accumulates on the surface of that member in the form of an increasingly concentrated deposit which is ultimately dislodged from that surface.

Another feature of the invention is the provision of a plurality of filter members forming a system of vanes rotating about a common axis within the preferably cylindrical vessel in which the liquid is held under pressure, each vane comprising a filter screen stretched over a suitable support; as each vane rotates, it communicates successively with different ports in which progressively diminishing counterpressures prevail to establish the aforesaid increasing pressure differentials, there being further provided a final port at which the pressure is reversed in order to help dislodge the accumulated concentrate from the screen. Means may be provided for subjecting the vane at this point to a mechanical scraping and/or jolting action in order to expedite the dislodgment.

A more particular feature of the invention is the construction of each vane as a corrugated sheet (e.g. of metal) covered on both sides with filter cloth, the corrugations of the sheet communicating with a common collector tube which, in an advantageous embodiment, also serves as a pivotal axle for the vane to enable an increased spacing of adjacent vanes at the point of deposit removal.

The above and other objects, features and advantages of my invention will become more fully apparent from the following detailed description, reference being made to the accompanying drawing in which:

FIG. 1 shows, in sectional elevation, a filtering device embodying the invention;

FIG. 2 is a top plan view of the device of FIG. 1 with the cover of the vessel removed;

FIGS. 7 and 8 are views similar to FIGS. 5 and 6 respectively, showing a vane provided with modified deposit-removing means;

FIG. 9 is a fragmentary sectional view of a vane, showing details of its construction; and FIG. 10 is a cross-sectional view taken on line X—X of FIG. 9.

Figure 3:
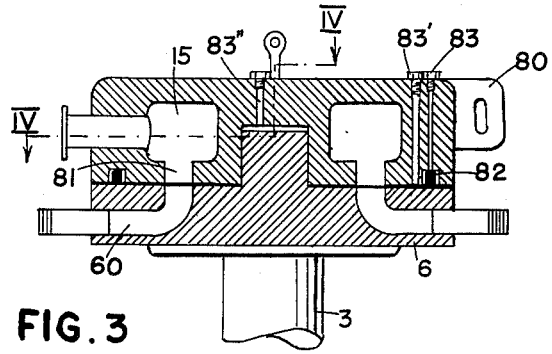
FIG. 3 is a fragmentary sectional view corresponding to the central upper part of FIG. 1, drawn to a larger scale.
Figure 4:
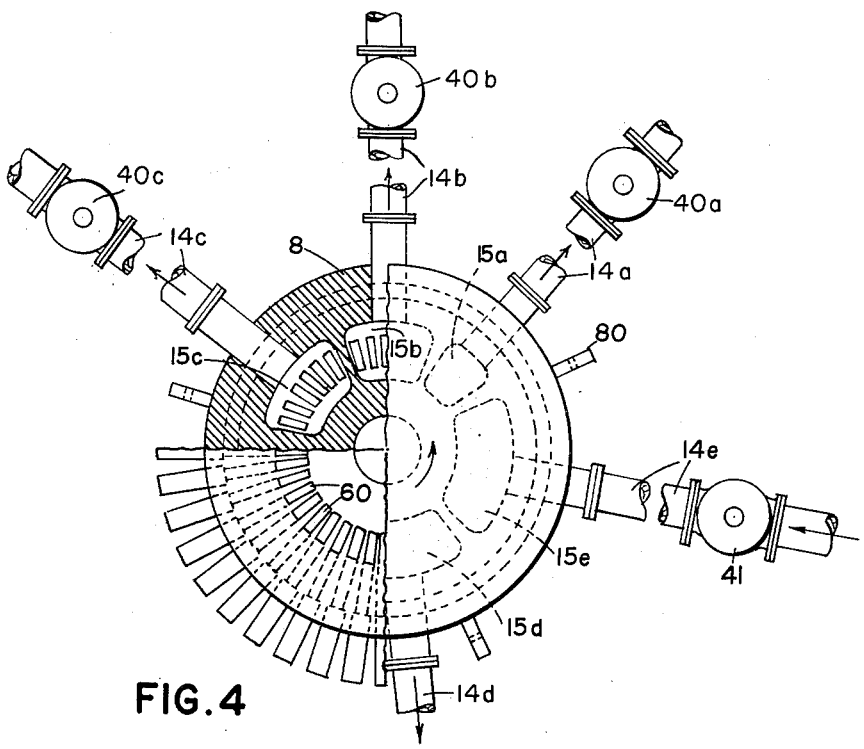
FIG. 4 is a top plan view of the assembly of FIG. 3, taken partly in section on the line IV—IV thereof.
Figures 5, 6:
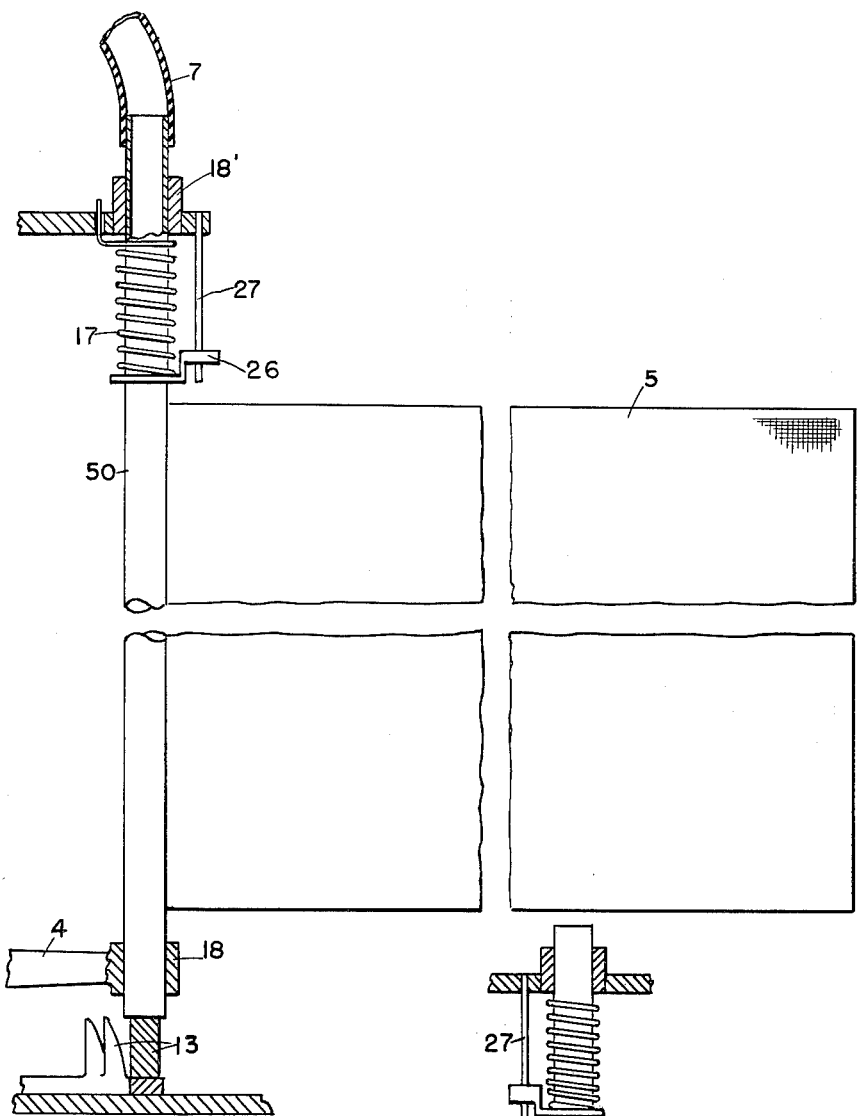
FIG. 5 is an elevational view of a single vane of the device of FIGS. 1–4, illustrating details of an associated deposit-removal mechanism.
FIG. 6 is a side view of the vane of FIG. 5.

Reference will first be made to the embodiment shown in FIGS. 1–6. A generally cylindrical vessel 1 is provided with a removable cover 2 and is axially traversed by a vertical shaft 3 supporting, by means of transverse arms 4, a large number of substantially radial vanes 5. Each of these vanes, as best seen in FIGS. 9 and 10, comprises a vertical tube 50, closed at the bottom and provided with a longitudinal slot 51, and a corrugated sheet 52 jacketed by a filter cloth 53. It will be apparent that the corrugations of the sheet 52, which may be soldered or spot-welded to the tube 50, form channels sheathed by the cloth 53 which communicate with the interior of this tube through its slot 51. The lower end of tube 50 rides on an annular cam 13 while being guided in a sleeve 18 supported by one of the arms 4, the upper end of the tube being similarly guided in a sleeve 18'. A coil spring 17, anchored at one end in the supporting arm of sleeve 18', bears upon a collar 26 on tube 50 to urge the latter downwardly against cam 13; the displacement of the tube and, hence, of the vane 5 is limited by an abutment 27 depending from sleeve 18' toward collar 26. Spring 17 also tends to maintain the vane 5 radially positioned with respect to shaft 3.

A flexible conduit 7 connects the open top of each tube 50 with a respective passage 60 in a collector plate 6 which is rigid with shaft 3 and rotates therewith counterclockwise (as viewed in FIGS. 2 and 4) under the control of a suitable motor 30, coupled with shaft 3 via a worm 31 and a worm gear 32. A stationary distributor head 8, held against rotation by lugs 80 and cooperating formations (not shown) on cover 2, is provided with ports 81 leading to internal cavities 15 within this head, some of these cavities having been designated 15a, 15b, 15c, 15d and 15e in FIG. 4. The cavities 15 open into respective tubes 14 provided with pressure-regulating valves 40; these tubes and valves are also identified in FIG. 4 as 15a, 15b etc. and 40a, 40b etc., in accordance with the cavities served thereby. Duct 14e, communicating with cavity 15e, contains a pump 41 adapted to return filtrate to the head 8 at a pressure greater than that with which raw juice is introduced into the vessel 1 by a pump 42 and an inlet pipe 24.

At a location radially aligned with cavity 15e, vessel 1 is provided with a funnel-shaped drain 9 having a discharge port 25. Rotatable within this drain, by means of a motor not shown, is an agitator 10 comprising a blade in the form of a frusto-conical helix, this blade being provided with numerous perforations 16. A pair of fins 11 on the lower part of shaft 3 sweep the unavoidably accumulating sludge toward the drain 9.

A peripheral cam 12 within vessel 1, engaging the free vertical edges of the vanes 5 as they approach the region of drain 9, exerts upon these edges a retarding force tending to rotate the vanes clockwise about their collector tubes 50, against the action of springs 17, to bunch the vanes ahead of the drain and to spread them farther apart above the drain, thereby facilitating the dislodgment of concentrate from the surface of cloth 53 at that point. In this position the passages 60 coming from the vanes communicate with the port 81 of cavity 15e into which filtrate is introduced by the pump 41 at a pressure greater than that prevailing within the vessel 1. Moreover, the cam 13 is provided at this location with one or more humps, best seen in FIG. 6, which jolt the vane against the force of spring 17, and/or its own weight, to jar all encrustations from the surface of the filter cloth. By this combined action the filter cloth is cleared in preparation for a new operating cycle.

In the course of such operating cycle, passage 60 of a given vane 5 communicates successively with the ports 81 of cavities 15a, 15b, 15c and 15d. The pressure-regulating valves 40a, 40b etc. of the associated tubes 14a, 14b etc. are so adjusted that a progressively decreasing counterpressure is built up in the interior of the vane, cavity 15d being maintained at atmospheric pressure so that the full delivery pressure of pump 42 is effective across the cloth 53 when the vane registers with that cavity. It will thus be seen that, as the concentrate accumulating on the exterior of cloth 53 develops into a cake of increased density, the filtration pressure is correspondingly increased; moreover, as is apparent from FIG. 4, the cavities 15a, 15b, 15c, 15d and their respective inlet ports 81 increase in radial extent so that the higher pressures are maintained for longer periods on each vane. In this manner a maximum amount of clear liquid is extracted from the charge of the vessel in the course of each operating cycle.

The agitator 9 is operated at a speed higher than that corresponding to the discharge capacity of outlet port 25. As a result, the concentrate deposited in drain 9 (which also includes the sludge swept up by the fins 11) is forced repeatedly through the perforations 16 to turn into a homogeneous mass.

In FIGS. 7 and 8 I have shown a modified mechanism for clearing the concentrate from the cloth 53 of vanes 5. The tube 50 of each vane no longer rides the cam 13, which has been omitted, but rests in a socket 18''; a frame 19 straddles each vane and is provided with wires 22 which extend horizontally across the frame and scrape the outer surfaces of cloth 53. A bracket 28 engages the top of the vane 5 and carries a stem 29 supporting the frame 19; a compression spring 20 surrounds the stem 29 and urges the frame upwardly against the lower face of a cam 21 which, in the region of drain 9, displaces the frame 19 against the force of spring 20 and causes the wires 22 to execute a wiping motion on the filter cloth.

If the material of filter screen 53 is sufficiently resilient, it will expand under the pressure of pump 42 so as to rub against the non-resilient wires 22 which, in such case, will act as scrapers even if held stationary. Naturally, the resiliency of the material must not be such that the cloth will be able to fill the corrugations of the sheet 52. It will be apparent, moreover, that the wires 22 may also be replaced by wide-mesh netting or the like.

In order to prevent the entrance of any concentrate from the surrounding fluid into the paths 60, 81, 15 of the clear liquid across the highly polished, relatively rotating faces of members 6 and 8, head 8 is provided with an annular groove 82 receiving a toroidal gasket 23. Lubricant may be admitted to the groove 82 and to the contacting surfaces via passages 83, 83', 83''. Inasmuch as the members 6 and 8 are surrounded by the juice within vessel 1, these contacting surfaces are urged against each other by the pressure of the juice to insure fluid-tightness of the system.

My invention is, of course, not limited to the specific embodiments described and illustrated; it will be understood, for example, that the cam 12 may be omitted with the system of FIGS. 7 and 8, that the shaft 3 need not pass vertically through the vessel 1 and that, in some cases, the pressure reversal provided by pump 41 or equivalent means will be sufficient to insure adequate periodic clearing of the filter screens. These and other modifications are, therefore, intended to be embraced in the spirit and scope of my invention except as otherwise limited by the appended claims.

I claim:

1. A filtering device comprising a vessel, a shaft traversing said vessel, a plurality of vane units mounted on and extending generally radially of said shaft, each of said vane units being formed with two parts relatively displaceable in a direction parallel to said shaft, one of said parts being a vane including a filter screen and a carrier provided with at least one channel covered by said screen, inlet means on said vessel for admitting a liquid to be filtered, pressure means connected to said vessel for applying pressure to the liquid therein, outlet means on said vessel positioned to communicate periodically with said channel in a first angular position of each vane for carrying off filtrate passed by the screen thereof, a source of reverse pressure positioned to communicate periodically with said channel in a second angular position of each vane for assisting in the removal of sludge from said screen, a drain eccentrically located in said vessel underneath said vanes adjacent said second position for receiving the removed sludge, mechanism for rotating said shaft and said vanes, and mechanical sludge-removing means operable upon the passage of said vane through said second position, said sludge-removing means including stationary cam means for momentarily reciprocating said parts relatively to each other in the region of said drain.

2. A device according to claim 1 wherein said parts include a support rigid with said shaft, said vane being axially movable by said cam means relatively to said support for jolting adhering sludge off the surface of said screen.

3. A device according to claim 1 wherein said vane is axially fixed with respect to said shaft, said parts including a scraper member movable by said cam means across the surface of said screen.

4. A filter device comprising a vessel, a shaft traversing said vessel, a plurality of vanes mounted on and extending generally radially of said shaft, each of said vanes including a filter screen and a carrier provided with at least one channel covered by said screen, inlet means on said vessel for admitting a liquid to be filtered, pressure means connected to said vessel for applying pressure to the liquid therein, outlet means on said vessel positioned to communicate periodically with said channel in a plurality of consecutive angular positions of each vane for carrying off filtrate passed by the screen thereof, said outlet means including a plurality of ducts respectively communicating with said channel in said angular positions and pressure-regulating means in said ducts maintaining therein progressively lower counterpressures all lower than the pressure of said inlet means, means for removing adhering sludge from said screen in a further angular position thereof, a drain eccentrically located in said vessel underneath said vanes adjacent said further position for receiving the removed sludge, said further position being interposed between the positions of lowest and highest counterpressures of said consecutive angular positions, and mechanism for rotating said shaft and said vanes in the direction of decreasing counterpressures.

5. A filter device comprising a vessel, a shaft traversing said vessel, a plurality of vanes mounted on and extending generally radially of said shaft, each of said vanes including a filter screen and a carrier provided with at least one channel covered by said screen, inlet means on said vessel for admitting a liquid to be filtered, pressure means connected to said vessel for applying pressure to the liquid therein, outlet means on said vessel positioned to communicate periodically with said channel in a plurality of consecutive angular positions of each vane for carrying off filtrate passed by the screen thereof, said outlet means including a plurality of ducts respectively communicating with said channel in said angular positions and pressure-regulating means in said ducts maintaining therein progressively lower counterpressures all lower than the pressure of said inlet means, means including a source of reverse pressure disposed to communicate periodically with said channel for removing adhering sludge from said screen in a further angular position thereof, a drain eccentrically located in said vessel underneath said vanes adjacent said further position for receiving the removed sludge, said further position being interposed between the positions of lowest and highest counterpressures of said consecutive angular positions, and mechanism for rotating said shaft and said vanes in the direction of decreasing counterpressures.

6. A filter device comprising a vessel, a shaft traversing said vessel, a plurality of vanes mounted on and extending generally radially of said shaft, each of said vanes including a filter screen and a carrier provided with at least one channel covered by said screen, inlet means on said vessel for admitting a liquid to be filtered, pressure means connected to said vessel for applying pressure to the liquid therein, outlet means on said vessel positioned to communicate periodically with said channel in a plurality of consecutive angular positions of each vane for carrying off filtrate passed by the screen thereof, said outlet means including a plurality of ducts respectively communicating with said channel in said angular positions and pressure-regulating means in said ducts maintaining therein progressively lower counterpressures all lower than the pressure of said inlet means, said ducts having entrance ports subtending progressively larger arcs for maintaining correspondingly longer contact with said channel, means for removing adhering sludge from said screen in a further angular position thereof, a drain eccentrically located in said vessel undereneath said vanes adjacent said further position for receiving the removed sludge, said further position being interposed between the positions of lowest and highest counterpressures of said consecutive angular positions, and mechanism for rotating said shaft and said vanes in the direction of decreasing counterpressures.

7. A filter device comprising a vessel, a shaft traversing said vessel, a plurality of vanes mounted on and extending generally radially of said shaft, each of said vanes including a filter screen and a carrier provided with at least one channel covered by said screen, inlet means on said vessel for admitting a liquid to be filtered, pressure means connected to said vessel for applying pressure to the liquid therein, outlet means on said vessel positioned to communicate periodically with said channel in a plurality of consecutive angular positions of each vane for carrying off filtrate passed by the screen thereof, said outlet means including a plurality of ducts respectively communicating with said channel in said angular positions and pressure-regulating means in said ducts maintaining thereby progressively lower counterpressures all lower than the pressure of said inlet means, said ducts having entrance ports subtending progressively larger arcs for maintaining correspondingly longer contact with said channel, means including a source of reverse pressure disposed to communicate periodically with said channel for removing adhering sludge from said screen in a further angular position thereof, a drain eccentrically located in said vessel underneath said vanes adjacent said further position for receiving the removed sludge, said further position being interposed between the position of lowest and highest counterpressures of said consecutive angular positions, and mechanism for rotating said shaft and said vanes in the direction of decreasing counterpressures.

8. A filtering device comprising a vessel, a shaft traversing said vessel, a plurality of vanes mounted on and extending generally radially of said shaft, each of said vanes including a filter screen and a carrier provided with at least one channel covered by said screen, inlet means on said vessel for admitting under pressure a liquid to be filtered, pressure means connected to said vessel for applying pressure to the liquid therein, outlet means on said vessel positioned to communicate periodically with said channel in a first angular position of each vane for carrying off filtrate passed by the screen thereof, sludge-removal means for removing adhering sludge from said screen in a second angular position thereof, said vanes being provided with pivotal axles permitting a limited angular displacement thereof, a drain eccentrically located in said vessel underneath said vanes adjacent said further position for receiving the removed sludge, and a mechanism for rotating said shaft and said vanes, said mechanism including guide means for rotating said vanes on said axles and in a sense bunching said vanes ahead of said second position and spreading them apart at said second position in the vicinity of the drain, thereby facilitating the removal of said sludge from said vanes by said sludge-removal means.

9. A device according to claim 8 wherein said guide means comprises a peripheral cam in said vessel and spring means urging said vanes into contact with said cam.

10. A device according to claim 8 wherein said pivotal axles are tubes connectable with said outlet means and communicating with said channels.

11. A filtering device comprising a vessel, a shaft traversing said vessel, a plurality of vanes mounted on and extending generally radially of said shaft, each of said vanes including a filter screen and a carrier provided with at least one channel covered by said screen, inlet means on said vessel for admitting under pressure a liquid to be filtered, pressure means connected to said vessel for applying pressure to the liquid therein, outlet means on said vessel positioned to communicate periodically with said channel in a first angular position of each vane for carrying off filtrate passed by the screen thereof, sludge-removal means including a source of reverse pressure disposed to communicate periodically with said channel for removing adhering sludge from said screen in a second angular position thereof, said vanes being provided with pivotal axles permitting a limited angular displacement thereof, a drain eccentrically located in said vessel underneath said vanes adjacent said further position for receiving the removed sludge, and mechanism for rotating said shaft and said vanes, said mechanism including guide means for rotating said vanes on said axles in a sense bunching said vanes ahead of said second position and spreading them apart at said second position in the vicinity of the drain, thereby facilitating the removal of said sludge from said vanes by said sludge-removal means.

12. A device according to claim 11, further comprising mechanical sludge-removing means on each vane periodically actuable by said mechanism upon passage of the vane through said second position.

References Cited in the file of this patent

UNITED STATES PATENTS

| | | |
|---|---|---|
| 1,887,129 | Hirsch | Nov. 8, 1932 |
| 1,989,306 | Beatty | Jan. 29, 1935 |
| 2,013,776 | Weisman | Sept. 10, 1935 |
| 2,197,971 | Elze | Apr. 23, 1940 |
| 2,691,445 | Eickmeyer | Oct. 12, 1954 |
| 2,876,905 | Daman | Mar. 10, 1959 |

UNITED STATES PATENT OFFICE
CERTIFICATE OF CORRECTION

Patent No. 3,056,504                      October 2, 1962

Paul Lavallée

It is hereby certified that error appears in the above numbered patent requiring correction and that the said Letters Patent should read as corrected below.

In the grant, lines 1 to 3, for "Paul Lavallée, of Paris, France, read -- Paul Lavallée, of Paris, France, assignor to Guy Gaudfrin, Sceaux (Seine), France, --; line 12, for Paul Lavallée, his heirs" read -- Guy Gaudfrin, his heirs --; in the heading to the printed specification, line 3, for "Paul Lavallée, 1 Rue Lord Byron, Paris 8, France" read -- Paul Lavallée, Paris, France, assignor to Guy Gaudfrin, Sceaux (Seine), France --.

Signed and sealed this 17th day of November 1964.

(SEAL)
Attest:

ERNEST W. SWIDER                      EDWARD J. BRENNER
Attesting Officer                       Commissioner of Patents